United States Patent Office 2,830,672
Patented Apr. 15, 1958

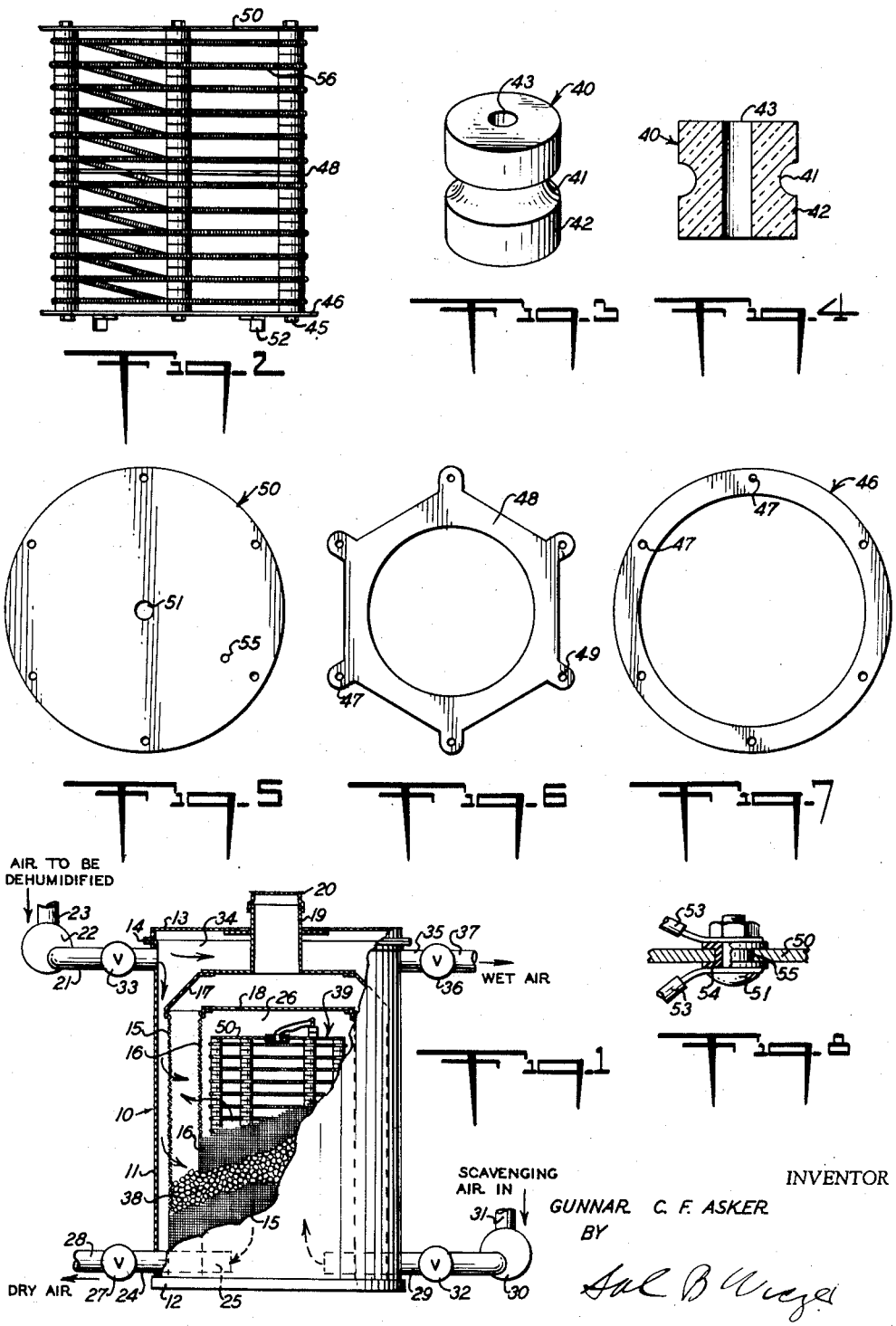

2,830,672

DEHUMIDIFIER AND ELECTRICAL HEATING ELEMENT THEREFOR

Gunnar C. F. Asker, Washington, D. C., assignor to Desomatic Products, Inc., Falls Church, Va., a corporation of Delaware Application June 17, 1955, Serial No. 516,060

1 Claim. (Cl. 183—4.5)

This invention relates to dehumidifier construction for removal of moisture from air and other gases wherein the bed is in the form of a hollow cylinder of substantial height and to an improved electrical heating element particularly useful for that type of dehumidified bed.

It is common engineering practice in the design of dehumidifiers to vary the quantity of bed material, such as porous silica gel granules and other granular type desiccant materials, with the volume of air or space to be dehumidified in order to provide for a reasonable dehumidification time cycle of such bed for maintaining the space dry without unduly rapidly saturating the bed with moisture.

Beds of desiccant conventionally comprise a solid body confined in a cylindrical casing. It is a usual practice for obtaining increased dehumidifying capacity for such bed to merely increase the height thereof and thereby the quantity of desiccant material comprising such bed. However, other design problems arise in such increased bed height due to increased resistance to flow of gases therethrough and consequent need for fans to move the gases under greater pressures. That pressure or resistance of the bed to the pasage of gases therethrough may vary considerably depending upon whether the material is dry at the beginning of a drying cycle or whether considerable moisture has been absorbed or the bed approaches saturation at the middle or toward the end of the drying cycle.

To overcome this, a much improved type of bed, according to the dehumidifier construction of the present invention, is one wherein the bed material is confined between concentric cylindrical foraminous walls, such as concentric cylindrical screens, and the gases are passed rapidly from the outside to the inside cylinder, or vice versa, across the bed confined therebetwen. The advantage of such construction is that the quantity of bed material traversed is constant and the thickness or depth of the bed may be adjusted to optimum for efficient gas drying at a given flow rate and the head pressure to be overcome by the fans to move the air across such bed remains in a narrow range most suitable for conventionally powered fans. Particularly it will be appreciated that in that type of construction the power requirements for a given quantity of gas flow becomes standardized in a manner whereby a unit becomes readily designed for any given service large or small by merely increasing or decreasing the height of the bed confined between foraminous cylindrical walls for greater or lesser capacity, and other factors of design become readily calculated as a multiple of the standard design.

Moreover, that hollow cylindrical type of desiccant bed provides an internal cylindrical space in which cylindrically disposed electrical heating coils are readily mounted close to the bed surface but out of contact with the bed material whereby bed regenerating gas may be passed evenly in contact with the heater elements immediately prior to entering the bed as controllably heated regenerating gas. That construction avoids heating of regenerated gas inlet passageways by remotely heated regenerating gas as heretofore practiced in the art, and greatly improves the economy of operation and construction of the dehumidifier such as by reducing heat losses in inlet passageways for preheated regenerating gas and insulation thereabout usually required in prior structures. Other heat economies available in this construction, such for example as the ability of the bed to have its temperature quickly reduced for the dehumidification cycle, will be apparent.

Accordingly it is an object of this invention to design a dehumidifier standardized whereby larger and smaller units are readily available by merely increasing the height of the bed or fixed cross section with respect to the distance of passage of gases therethrough for optimum drying.

A further object is to provide a heater unit particularly adapted for mounting in the hollow cylindrical bed space for heating a bed of this character, so flexible and economical in construction that the height of the heater may be readily varied for supply of heat to a bed of any given height corresponding to design requirements of the service intended for any particular dehumidifier.

Other objects will be inherent in the construction shown and best understood from the drawings in which Fig. 1 shows an elevation of a dehumidifier unit with parts broken away to show internal construction according to the present invention;

Fig. 2 shows a side elevation of an assembly comprising an elongated electrical heating element useful for heating the bed;

Fig. 3 shows a ceramic spool insulator in perspective used in the construction of the heating element of Fig. 2;

Fig. 4 is an elevation in section through the center of the spool of Fig. 3;

Fig. 5 is a plan view of the top bracketing plate of the electrical heater assembly;

Fig. 6 is an intermediate bracing bracket;

Fig. 7 is an annular bracket supporting the bottom of the heater assembly; and

Fig. 8 is a detail of wiring.

Referring first to Fig. 1 the dehumidifier 10 generally comprises a cylindrical housing comprising a tank or container having an upright cylindrical outer wall 11 closed at the bottom by an annular plate 12 and at the top by an annular cover 13, which may be welded or removably bolted to the cylindrical wall 11 through annular side flanges 14.

Concentrically mounted within the cylindrical housing wall 11 and spaced therefrom for air passage is an outer cylindrical strong wire foraminous screen 15 which is fixed, as by welding, to the bottom plate 12 and extends upwardly therefrom terminating a short distance from the top 13. Concentrically disposed within screen 15 is another heavy gauge wire screen 16 of smaller diameter similarly fastened to the bottom plate 12 and extending upwardly the same height as screen 15. The outer cylindrical screen 15 is fastened as by bracketing to an upper annular dished shell cover 17; and the inner screen 16 is fastened to an annular plate cover 18, both the covers 17 and 18 being imperforate so that no gas may pass across either. The upper shell 17 has a large diameter tube 19 fitted to its center in gas-tight communication with the space between covers 17 and 18, and tube 19 passes upwardly from the center of cover 17 and out of housing 10 in gas-tight fit through the top plate 13. The tube 19 is closed by a removable cap 20.

A bed 38 of gas such as air drying material is assembled between the screens 15 and 16 by pouring granular desiccant such as large mesh silica gel into the concentric cylindrical screens through the tube 19, the cap 20 being opened for that purpose. For supply of gas, such as air, to be dehumidified to the unit, a duct 21 is fitted near the top of housing 10 to communicate with the space 34 above the upper shell cover 17. The duct 21 further has mounted in circuit therewith a fan or blower 22 which draws the air to be dehumidified in through a duct 23 communicating with the air space to be dehumidified. A valve 33 is mounted in duct 21 for control of passage of inlet air to be dehumidified to space 34. A dehumidified air outlet duct 24 is mounted through the cylindrical housing wall 11 preferably near the bottom and has an inner end 25 extending across both screens 15 and 16 to the cylindrical space 26 formed within the inner screen 16. A valve 27 for control of gas flow through duct 24 is mounted therein and the duct 24 may continue in a duct 28 for return of dehumidified air to the air space to be dried. Another preferably oppositely mounted duct 29, similarly communicating with the space 26, is mounted through the wall 11 and similarly traversing both screens 15 and 16, supplies scavenging air to the space 26 by way of a scavenging air blower or fan 30 taking scavenging air from any space outside of the system through a scavenging air inlet duct 31. A valve 32 is mounted in duct 29 for control of gas flow therethrough. A wet air outlet duct 35 is mounted preferably near the top of housing 10 preferably opposite to duct 21 also to communicate with the outer chamber space 34. That duct 35 further has a valve 36 for control of gas flow therethrough. The duct 35 communicates with a duct 37 which passes wet scavenging air to a waste gas disposal area outside of the system.

In the construction thus far described the air to be dried, drawn through duct 23 by fan 22, passes into the open chamber portion 34 near the top of the housing 10 and thence downwardly near the sides of a cylindrical wall 11 passing downward evenly about the elongated cylindrical screen 15 which confines the outside of the bed of drying material 38 between it and inner cylindrical screen 16 as an evenly thick walled hollow cylinder of desiccant. The air passes across the cylindrical bed 38 from the space 34 into the central space 26 and is dried thereby. From inner space 26 the dry air passes out through ducts 24 and 25 and back to the dry air space to be dehumidified through duct 28. For that drying cycle the valves 33 and 27 are both open and valves 32 and 36 are shut. That type of construction it will be appreciated has the bed 38 of constant thickness and the capacity of such drier may be readily increased or decreased by merely making the bed higher, and the shell 11 correspondingly higher, the quantity of bed or desiccant material being increased for greater height provides greater drying capacity without need for varying the thickness of the bed. Hence substantial change of design characteristics from one capacity drier to another is unnecessary.

For regeneration of this type of bed an improved electrical heating element 39 is mounted in the central cylindrical space 26 concentric with and closely adjacent to the inner screen 16. The electrical heating element for such bed is an important feature of this invention, and it is particularly designed for highly efficient heating of a bed of this character and includes features of ultimate simplicity and economy for readily varying the capacity of such heater with variation in size of the unit as needed.

For this purpose the electrical heater as shown in Fig. 2 is constructed of several, at least 3, in this instance 6, tiers or columns of electrical insulating spools 40 preferably of ceramic ware as shown in Figs. 3 and 4. The spools 40 are cylindrical insulating bodies, each having a deep groove 41 which divides the cylindrical walls thereof into flange portions 42 which act as separator or spacer elements. Each spool 40 is axially bored at 43 for receiving a supporting, usually metal, rod 45 in sliding fit therethrough for assembly in a tier or column of insulating spools elongated to whatever desired height is needed by the electrical heater mounted in space 26 for supplying heat from the bottom to the top of the desiccant bed 38.

The rods 45 are supported in disk or plate-like annular brackets in several radially disposed columns as shown in Fig. 2. The bracket at the bottom of the assembly as shown in Fig. 2 is an annular metal ring 46 as further shown in detail in Fig. 7. The ring 46 is bored with 6 evenly spaced holes 47 through which the rods 45 are passed for bracket-like support vertically. An intermediate bracket 48 as shown in Fig. 6 is mounted at an intermediate point of the columns of spools 40 to stiffen or brace each column. The bracket member 48 may be cut inward as shown in Fig. 6 to provide minimum interference with coiled resistance wires 56 ultimately assembled around the spools. Both brackets 46 and 48 are ring-like and are open in the center to provide minimum interference with gas passed through the heater assembly. The bracket 48 has several ears 49 correspondingly spaced therearound as the holes 47 in bracket 46, said ears 49 being correspondingly bored at 47 to support the rods 45 at the intermediate positions. That inward disposition of the bracket body 48 from extended ears 49 provides a narrower annular opening at the center of bracket member 48 as shown in Fig. 6, and considerably decreases the area of its central open portion with respect to the open portion of the lower bracket 46 as shown in Fig. 7. When assembled into the assembly of Fig. 2, gas passing axially upward through the assembly from the bottom toward the imperforate top bracket 50 is all deflected laterally, and by the decreased open portion of the bracket, the gas is deflected in relatively even lateral distribution.

The upper plate bracket 50 as shown in Fig. 5 is an annular disk which is substantially entirely closed across the center portion to resist air passage therethrough except for the small holes bored at 51 and 55 for passage of electrical conductor wires therethrough to and from the coil heating elements and to support electrical connectors, etc.

Fig. 8 shows a manner of mounting the electrical wires to or through said upper plate element 50 to provide support for electrical connection of lead wires. The electrical heater element is assembled by inserting elongated rods 45 through the upper or lower bracket, one through each hole 47, the ceramic spools 40 are then slid on to each rod through their apertures 43 and after several, four to eight more or less, have been so added, an intermediate bracket 48 to provide central stiffening is added to the partial assembly, and then additional spools are assembled above the bracket 48 to the desired height. Finally the last top or bottom bracket such as 50 or 46 is assembled over the ends of each rod and bolted to a firm assembly as shown in Fig. 2. The lower plate 46 may have small right angle supports 52 bolted or welded around the bottom to act as foot pieces for support of the assembly a slight distance above the bottom of the space to be heated to allow free air circulation through the lower portion of the heating element. Thereafter helically coiled electrical resistance wire 56 such as standard gauge Nichrome is wound from spool to spool in a layer moving to a next layer of spools as a helix in a manner so that the coiled resistance electrical heater wire is retained in a portion of each groove 41 of a spool 40 and stretched under slight tension in assembly sufficient to eliminate any sag of wire between spools. Thus, the framework of columns of spools firmly supports a helix of resistance wire about the outside thereof as in the surface of a cylinder.

Lead wires may be taken from each end, and if desired at intermediate portions, and threaded through the top plate opening 51 for connecting to a usual electrical heater circuit. The lead wires 53 may be secured at one or more points of the bracket 50 for connecting to lead wires of an electrical circuit supplied outside of the system shown in detail Fig. 8. For this purpose an insulator grommet such as a rubber sheath 54 may be inserted in a small bore of the plate 50 at 55 through which may be mounted any type of binding post 51 which as shown may be a bolt and nut to which the lead wires 53 are secured for electrical connection.

An advantage of this simple construction, as a heater element for a dehumidifier of the type described, is that the heater element may be readily modified to any desired height and heating capacity by a simple addition of more spools 40 assembled on rods of desired length and addition of longer resistance wire 56.

The entire heater unit as a dehumidifier heater element is inserted within the space 26 of the dehumidifier and the diameter of the heater is such as to space the heater elements comprising a cylindrical surface closely adjacent to the inner cylindrical screen 16 of the bed as shown in Fig. 1 for optimum heat transfer thereto.

Another substantial advantage of this type of heater is that sufficient capacity is readily built into the heater element to provide all of the heat that is needed, i. e. to quickly heat air for regeneration of the bed to a temperature in the range of 300° to 400° F. without need for overloading the heater wire element by application of conventionally available electric current such as 110 volts at 60 cycles whereby the life of the heater wire is greatly increased. A further advantage of a heater constructed as described and so arranged for heating a dehumidifier bed, is that there is no necessary contact between the heater elements and the desiccant bed material. That is, while the heater element construction here shown might be placed within the bed of drying material in direct contact with the desiccant, the present construction herein shown allows placing the heater outside of the bed out of direct contact therewith. Consequently, there is no tendency to corrode the heater elements by moisture absorbed and acidic impurities often contained in the desiccant. Conversely, the mounting of the heater element outside of the bed per se eliminates any possibility of even momentary overheating and thereby destroying and crumbling of the desiccant material which in other constructions is usually placed in direct contact with the electrical heating element. Finally, it will be noted that the heating of regeneration gas takes place immediately before the gas enters the bed so that the temperature of the gas is easily and closely controlled by a thermostatic control applied to the heater element. By this type of heat supply no scavenging gas is heated until just prior to passing into the bed thereby greatly reducing heat losses.

In operation for regenerating the bed 38 using the above described construction, valves 32 in scavenging air inlet 29 and 36 in the wet air outlet duct 35 are open and valves 27 and 33 are closed. Scavenging air drawn from an extraneous source through duct 31 and blown by fan 30 through duct 29 passes into the chamber space 26 and thence evenly over the heating wires 56 maintained at a temperature between 300° and 400° F. by a thermostat in circuit (not shown). The air is heated to that temperature range and passes radially through the bed 38 being deflected laterally for that purpose by the upper plate 50. The hot air picks up moisture from the desiccant 38 regenerating the same, and the hot wet air then passes by way of space 34 out of the dehumidifier through duct 35 and 37 to a waste gas disposal area.

It will be apparent that substantial advantages both in economy of construction and operation are present in the dehumidifier and electrical heater construction therefor herein described.

Certain modifications will occur to those skilled in the art. For example, conventional elements of known dehumidifier construction for filtering of gas to be dehumidified; for automatic operation of the valves and thermostatic temperature control may be added to the dehumidifier as herein described. Moreover, the present dehumidifier may be used in combination with another for continuous operation of one unit for dehumidification of air while the other is having its bed regenerated, as known in the art, and may be applied in modification of the structure shown herein. It is accordingly intended that the description herein given be regarded as illustrative and not limiting except as defined in the claim appended hereto.

I claim:

Dehumidifier comprising a housing, a pair of spaced substantially concentric cylindrical screens mounted within and spaced from the housing wall for passage of gas radially across said screens, said screens being sealed at the top and bottom to prevent substantial passage of gas therethrough vertically, granular desiccant material filling the space between said screens and confined thereby as a cylindrical desiccant bed for passage of gas radially therethrough in the dehumidification, whereby said cylindrical wall of desiccant material forms an open cylindrical gas space at the cylindrical center portion thereof, means for passing gas for dehumidification to the outside of said cylindrical bed and means for withdrawing dehumidified gas passed radially through said cylindrical bed into the said open cylindrical space at the center thereof, means for passing scavenging gas for regeneration of said bed to the open cylindrical center space for radial flow in reverse direction across said cylindrical bed for removal of adsorbed moisture from said desiccant in the regeneration thereof, means for withdrawing the wet scavenging gas evolved from the outside of said cylindrical bed and dispose thereof outside of said housing, an electrical heating means mounted in the central cylindrical space formed within said cylindrical bed, said electrical heating means comprising a plurality of vertical elongated supporting rods each covered with a column of insulator spools assembled for support thereon from one end to substantially the opposite end of each rod, each spool having a grooved portion on its surface for support of a cylindrically disposed helically coiled resistance wire about the outside of said spools, several disc-like bracketing members each secured at several annularly distributed edge portions to each column of spools to vertically support each as an annular cylindrical assembly of columns of insulating spools, said bracketing members being secured to said columns in several horizontal layers at the top, the bottom and at least one intermediate height position of each column, said disc-like bracketing members being dimensioned to support said columns of spools as a cylindrical framework within the said open central cylindrical space and said cylindrical bed of desiccant material, said framework being disposed close to but spaced from said desiccant material, the uppermost bracketing member of said framework comprising an imperforate plate, the lowermost bracketing member being widely open at the center for allowing passage of gas axially upward therethrough, said intermediate bracketing member being of smaller diameter at the open central portion than the diameter of the center portion of the lowermost bracketing member, whereby scavenging gas axially entering said framework and passing upwardly from the bottom is gradually diverted radially as it passes upward from the bottom to the top of said framework, and a coil of electrical resistance heater wire wound from spool to spool for support in the grooved portions thereof as a helix about the outside of the cylindrical framework of the columns, whereby the said electrical heater wires are disposed in a substantially cylindrical surface about said spools, and whereby the scavenging gas deflected radially through said heater element becomes heated by said heater wire immediately prior to entering said desiccant bed for regeneration thereof.

(References on following page)

References Cited in the file of this patent

UNITED STATES PATENTS

| | | | |
|---|---|---|---|
| 2,478,393 | Haarman | Aug. 9, | 1949 |
| 2,519,296 | Simpson | Aug. 15, | 1950 |
| 2,563,042 | Jaubert | Aug. 7, | 1951 |
| 2,671,525 | Asker | Mar. 9, | 1954 |

FOREIGN PATENTS

| | | | |
|---|---|---|---|
| 39,839 | Norway | Sept. 29, | 1924 |
| 569,228 | France | Jan. 6, | 1924 |
| 571,366 | France | Jan. 31, | 1924 |